(12) United States Patent
Ouyang et al.

(10) Patent No.: US 7,542,390 B2
(45) Date of Patent: Jun. 2, 2009

(54) METHOD FOR SAMPLING OPTICAL DISC DATA AND APPARATUS THEREOF

(76) Inventors: SL Ouyang, c/o 8F, No. 533, Chung-Cheng Rd., Hsin-Tien City, Taipei Hsien (TW); Yi-Lin Lai, c/o 8F, No. 533, Chung-Cheng Rd., Hsin-Tien City, Taipei Hsien (TW); Pei-Jei Hu, c/o 8F, No. 533, Chung-Cheng Rd., Hsin-Tien City, Taipei Hsien (TW)

( * ) Notice: Subject to any disclaimer, the term of this patent is extended or adjusted under 35 U.S.C. 154(b) by 813 days.

(21) Appl. No.: 10/907,859

(22) Filed: Apr. 19, 2005

(65) Prior Publication Data
US 2005/0251671 A1      Nov. 10, 2005

(30) Foreign Application Priority Data
Apr. 19, 2004   (TW) .............................. 93110814 A (51) Int. Cl.
*G11B 15/52*      (2006.01)
(52) U.S. Cl. ................ 369/47.35; 369/47.19; 369/53.12

(58) Field of Classification Search ....................... None
See application file for complete search history.

(56) References Cited

U.S. PATENT DOCUMENTS

| 5,844,920 | A  | * | 12/1998 | Zook et al. .................. 714/769 |
| 6,970,522 | B1 | * | 11/2005 | Morling et al. ............. 375/341 |
| 7,242,650 | B2 | * | 7/2007  | Tsai et al. ................ 369/47.28 |

* cited by examiner

*Primary Examiner*—Paul Huber
(74) *Attorney, Agent, or Firm*—Perkins Coie LLP (57) ABSTRACT

Technology for sampling optical disc data are described. A first sync tag signal and a data signal are provided, and the previous first sync tag signal is saved as a second sync tag signal. Then, the value of the first sync tag signal and the second sync tag signal are determined to be true or false so as to divide the data signal. Since the neighboring sync tag signals are detected simultaneously, and the timing for sampling the data in the frame is determined according to whether the two contiguous sync tag signals are true or false, the technology can reproduce optical disk data accurately.

25 Claims, 5 Drawing Sheets

METHOD FOR SAMPLING OPTICAL DISC DATA AND APPARATUS THEREOF

CROSS-REFERENCE TO RELATED APPLICATION

This application claims the priority benefit of Taiwan application serial no. 93110814, filed on Apr. 19, 2004. All disclosure of the Taiwan application is incorporated herein by reference.

BACKGROUND OF THE INVENTION

1. Field of the Invention

The present invention relates to a method for reading optic disc data, and more particularly, to a method for sampling optic disc data.

2. Description of the Related Art

Among different types of storage media, the optical disc is commonly used in various fields due to its characteristic of high capacity, low cost, and portability. It is applied in storing data, listening music, and watching movies. In order to adapt to the characteristic of optical disc and to increase the reliability of the optical disc data reading, during the data is being stored into the optical disc, the current burning status in optical disc is changed when the data value is 1, and the current burning status in optical disc is not changed when the data value is 0.

During the data is being stored into the optical disc, an eight to fourteen modulation (EFM) process and a Reed-Soloman code modulation process are performed on the data, and the sequence of data storing is interleaved. The EFM process converts 8-bit data into a 14-bit data for in Compact Disks (CDs) and converting 8-bit data into a 16-bit data for Digital Versatile Discs (DVDs), and the EFM processed data is stored into the optical disc.

In order to read data from the optical disc, it is required to sense the laser light reflected by the optical disc to obtain a radio frequency data (RF DATA) first, and then based on the RF DATA to generate a digital data signal DSEFM and a clock signal EFMCLK. The EFM data decoding are applied further onto these two data signals so as to perform a subsequent optical disc decoding process.

Since the optical disc provides a high density for data storage, and the reading speed of the current optical disc drive is higher now, many techniques for improving the reading reliability (e.g. EFM technique mentioned above) have to be involved in order to accurately read the content of the optical disc. In addition, for every a predetermined length of the data stored in the optical disc, a sync pattern is inserted into the data for accurately reading the optical disc data. The session of the stored data with a predetermined length plus the sync pattern mentioned above is referred to as a frame.

However, the data read from the optical disc is a serial signal. In order to accurately read the serial signal, it is required to divide the serial signal based on an accurate clock signal. If the timing of dividing the serial signal is not correct, the data signal DSEFM obtained is misread. In the prior art, a timing for detecting a sync pattern is used as a base for dividing data, and a counter is used to issue a data sampling tag signal when the clock signal EFMCLK counted by the counter reaches the length of the EFM data unit. As a result, the next stage circuit can accurately sample the data signal DSEFM according to the timing of the data sampling tag signal.

Figure 1A:
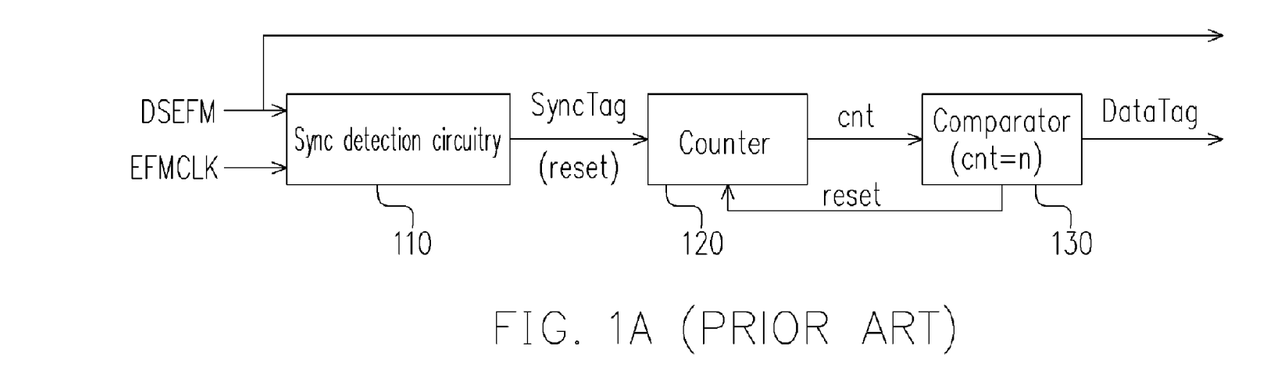
FIG. 1A is a schematic block diagram of a conventional optical disc data sampling apparatus.
Figure 1B:
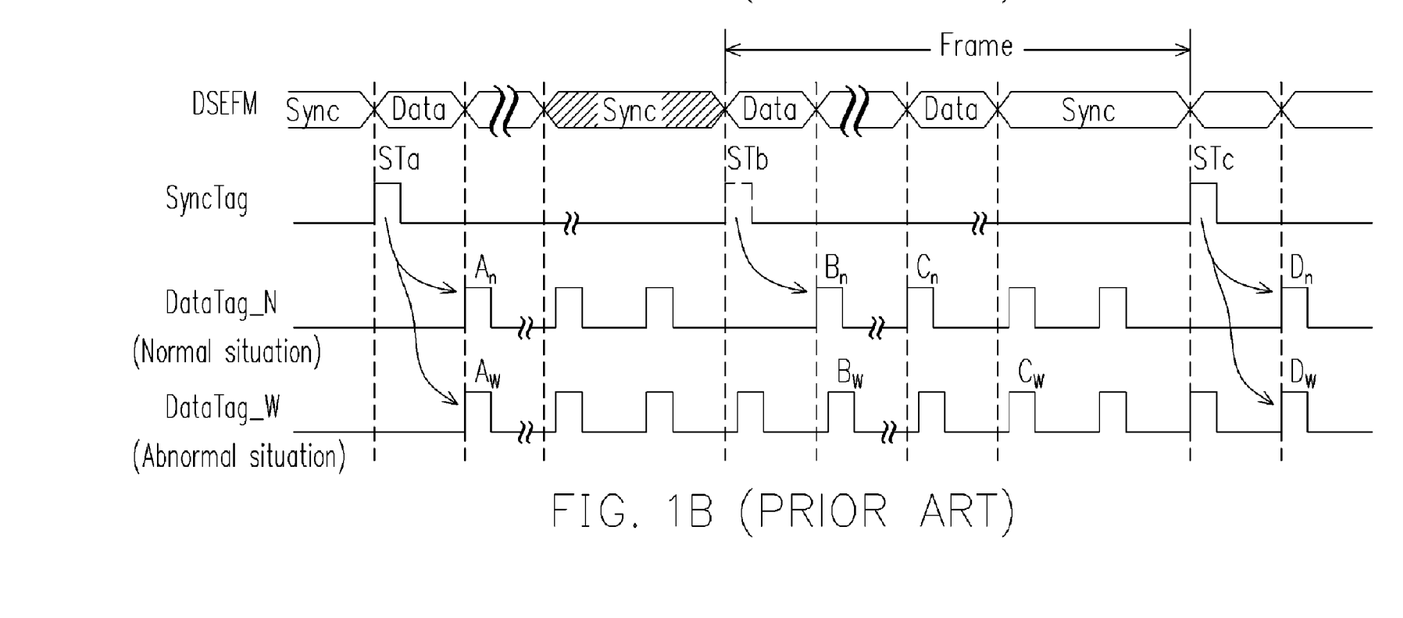
FIG. 1B is a timing diagram of the signals shown in the circuitry of FIG. 1A.

FIG. 1A is a schematic block diagram of a conventional optical disc data sampling apparatus. FIG. 1B is a timing diagram of the signals shown in the circuitry of FIG. 1A. Referring to both FIGS. 1A and 1B, a sync detection circuitry 110 receives a clock signal EFMCLK and a data signal DSEFM, and detects a sync pattern "sync" from the data signal DSEFM based on the clock signal EFMCLK. Once the sync detection circuitry 110 detects the sync pattern "sync", a sync tag signal "SyncTag" is issued. A counter 120 counts the number based on a timing (e.g. a timing of the clock signal EFMCLK) and generates a counting result "cnt". The counter 120 resets the counting result "cnt" based on the sync tag signal "SyncTag" or a reset signal "reset" and recounts the number again. A comparator 130 receives the counting result "cnt" and compares it with a predetermined value "n". Once the counting result "cnt" is accumulated to the predetermined value "n", the comparator 130 issues a data sampling tag signal "DataTag" and the reset signal "reset".

FIG. 1B schematically illustrates the relationship among the signals mentioned above. Under a normal situation, the counter 120 of the conventional optical disc data sampling apparatus automatically counts the number and regularly generates a data sampling tag signal "DataTag_N" (i.e. the data sampling tag signal "DataTag" shown in FIG. 1A). Ideally, the timing spacing of two neighboring data sampling tag signals "DataTag_N" should match to the timing of a single record data in the data signal DSEFM. However, errors occur in the timing of the physical data sampling tag signal "DataTag_N", and the errors may be a lead or a lag error. As the reading data "Data" is increasing, the timing error of the data sampling tag signal "DataTag_N" gradually accumulates, which causes an error on the result of the dividing and sampling of the data signal DSEFM. The data sampling tag signal "DataTag_N" shown in the diagram is an example of a timing lag for explaining the error mentioned above, for example, the signal after the signal "An" is mildly lagged. In order to solve this problem, the prior art uses a sync tag signal "SyncTag" to control the counter 120 for recounting, thus the timing of the data sampling tag signal "DataTag_N" has to be tuned at the right timing. For example, the signal "Bn" shown in the diagram is a signal tuned by the signal "STb" to the right timing.

However, it is well known that the optical disc which is a round plate make of a plastic material is easily scratched. When reading a defective area caused by a scratch or other reason, the sync pattern "sync" cannot be normally detected (i.e. it is not possible to generate the sync tag signal "SyncTag" at the right timing based on the assumption of the sync tag signal "STb" is has not happened). In the prior art, during the reading of the defective area, the sync tag signal "SyncTag" generated by the previous good data area (e.g. the sync tag signal "STa" as shown in the diagram) is used as a base timing to control the counter to continuously count the number, and to continuously generate a data sampling tag signal "DataTag_W" accordingly until next sync tag signal "SyncTag" is appeared (e.g. the sync tag signal "STc" as shown in the diagram). After comparing the data sampling tag signal "DataTag_N" generated under a normal situation with the data sampling tag signal "DataTag_W" which is not accurately tuned in time, it is known that the timing error of the signal "Bw" is continuously accumulated due to the fact that the signal "STb" does not appeared in time. Finally, the signal "Cw" cannot accurately divide the data "Data" (originally, the signal "Cw" should have the same timing as the signal "Cn" has).

In summary, in the prior art, when sampling the data read from the optical disc, the clocks are counted for providing a data sampling tag signal "DataTag" at a right time, and the sync tag signal "SyncTag" is used to correct the timing of the data sampling tag signal "DataTag" in time. When reading the defective area caused by a scratch or other reason, usually it is not possible to generate the sync tag signal "SyncTag" at the right time. In such a case, the prior art uses a sync tag signal "SyncTag" generated by the previous good data area as its base timing to control the counter to continuously count the number, and to continuously generate the data sampling tag signal "DataTag" accordingly until next sync tag signal "SyncTag" appears.

SUMMARY OF THE INVENTION

In order to avoid the disadvantages in the prior art, the present invention provides a method for sampling optical disc data. The method can accurately sample the data read from the optical disc's defective area caused by a scratch or other reason. As a result, the accuracy and the reliability of data reading from an optical disc are improved.

The present invention further provides an optical disc data sampling apparatus. Based on the same reason mentioned above, the apparatus can accurately sample the data read from the optical disc's defective area caused by a scratch or other reason and not be impacted by the missing of the sync tag signal. As a result, the accuracy and the reliability of data reading from optical disc are improved.

The present invention provides a method for sampling optical disc data, and the method includes the following steps. First, a first sync tag signal and a data signal are provided, and the previous first sync tag signal is saved as a second sync tag signal. Thereafter, it is checked and determined whether the value of the first sync tag signal and the second sync tag signal is true or false. Finally, the data signal is divided according to the determining result of whether the value of the first sync tag signal and the second sync tag signal is true or false. In accordance with the preferred embodiment of the present invention, wherein the step of dividing the data signal according to the determining result of whether the value of the first sync tag signal and the second sync tag signal is true or false further includes: if only the first sync tag signal is true, using a timing of the first sync tag signal as a base to backwardly divide the data signal in accordance with the data length unit; and if only the second sync tag signal is true, using a timing of the second sync tag signal as a base to forwardly divide the data signal in accordance with the data length unit. The so-called "backwardly" means the timing is counted from the base back to a past time, and the so-called "forwardly" means the timing is counted from the base to a future time.

In addition, in accordance with an embodiment of the present invention, the step of dividing the data signal according to the determining result of whether the value of the first sync tag signal and the second sync tag signal is true or false further includes a step, which is optionally selected from following three steps. If both the first sync tag signal and the second sync tag signal are true, respectively using a timing of the first sync tag signal and a timing of the second sync tag signal as its base to simultaneously backwardly and forwardly divide the data signal in accordance with the data length unit. If both the first sync tag signal and the second sync tag signal are true, using a timing of the first sync tag signal as its base to backwardly divide the data signal in accordance with the data length unit. If both the first sync tag signal and the second sync tag signal are true, using a timing of the second sync tag signal as its base to forwardly divide the data signal in accordance with the data length unit.

The present invention provides an optical disc data sampling apparatus in accordance with the method mentioned above. The sampling apparatus comprises a sync detection circuitry, a latch, a sample tag generating circuitry, and a memory. The sync detection circuitry receives a clock signal and a data signal, and generates a first sync tag signal by using the clock signal to detect the data signal. An input terminal of the latch receives the first sync tag signal, and an output terminal of the latch outputs a second sync tag signal. The sample tag generating circuitry receives the first sync tag signal and the second sync tag signal, and generates a data sampling tag signal based on the result of whether these two signals are true or false. The memory stores the data signal, and the optical disc sampling apparatus outputs the data signal in accordance with the timing of the data sampling tag signal from the memory.

In accordance with the optical disc sampling apparatus of an embodiment according to the present invention, the capacity of the memory mentioned above must be at least big enough to store an entire frame of data. In addition, the sample tag generating circuitry mentioned above may be implemented in accordance with the embodiment of the present invention and includes a counting-start position detection circuitry, a counter, and a comparator. The counting-start position detection circuitry determines a timing for starting to sample the data signal according to the result of whether the first sync tag signal and the second sync tag signal are true or false, and provides a third sync tag signal according to the sampling-start timing. The counter accumulates a counting value started from an initial value based on a predetermined timing, and obtains and outputs the counting value, wherein, the counter resets the counting value to the initial value according to the reset signal or the third sync tag signal. The comparator receives the counting value and compares it with a predetermined value. When the counting value reaches the predetermined value, the reset signal and the data sampling tag signal are propagated. The principle for determining the sampling-start timing by the counting-start detection circuitry is the principle for determining whether the first and the second sync tag signals are true or false as mentioned above.

Since the neighboring sync tag signals are detected simultaneously, and the timing for sampling the data in the frame is determined according to the true-false relation of two contiguous sync tag signals, the present invention can avoid the disadvantages of the prior art.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

To facilitate the explanation of the present invention and each embodiment, the so-called "backwardly" means the timing is counted from a certain base to a past time, and the so-called "forwardly" means the timing is counted from a certain base to a future time hereinafter.

Figure 2:
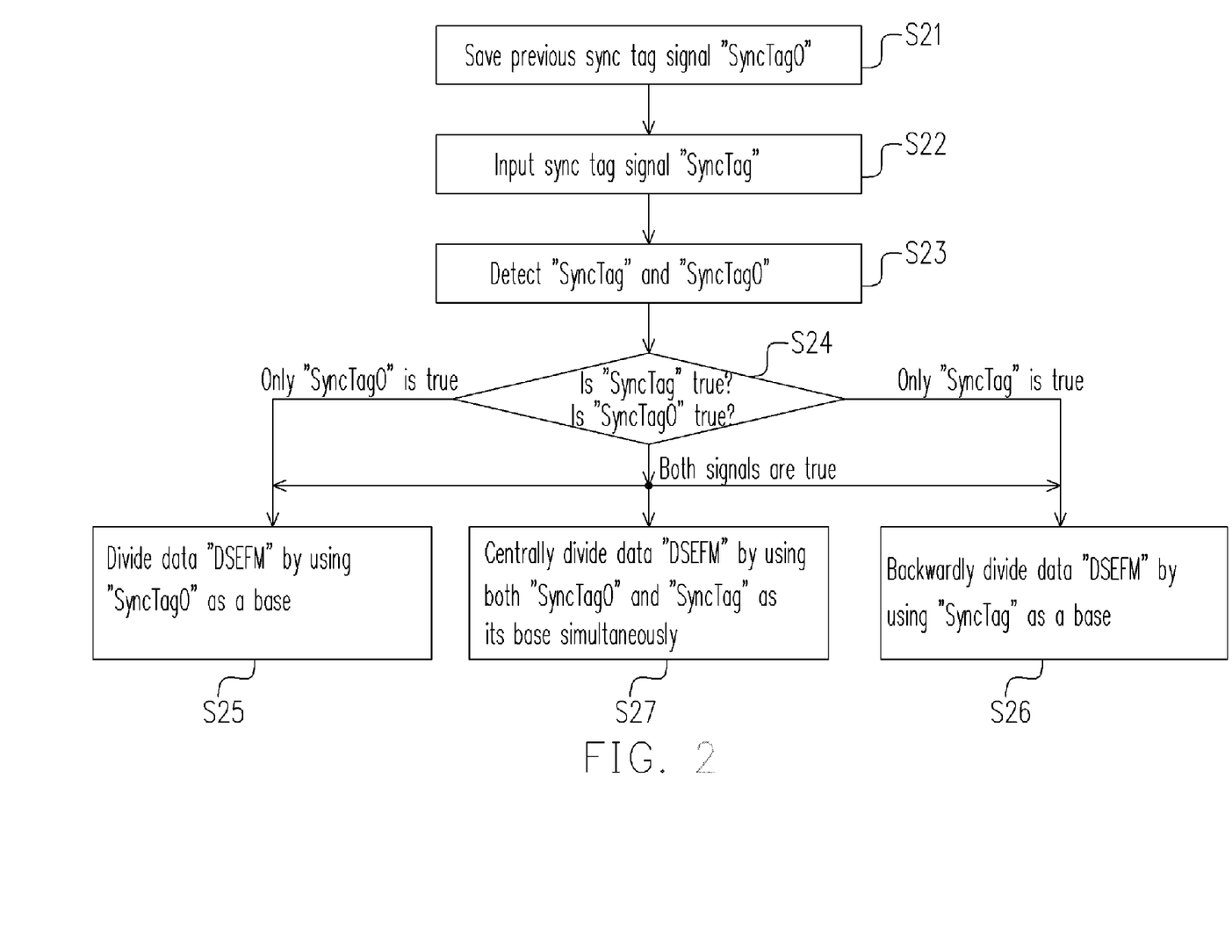
FIG. 2 is a flow chart illustrating a method for sampling optical disc data according to an embodiment of the present invention.

FIG. 2 is a flow chart illustrating a method for sampling optical disc data according to an embodiment of the present invention. Referring to FIG. 2, a sync tag signal "SyncTagO" appeared in the previous time is saved in step S21. Then both the sync tag signal "SyncTag" and the data signal "DSEFM" most recently appeared are received in step S22, wherein, the sync tag signal "SyncTagO" and the sync tag signal "SyncTag" are two signals appearing contiguously. The sync tag signal "SyncTagO" and the sync tag signal "SyncTag" are further detected in step S23, and step S24 is performed after the detection is completed. The true-false relation of these two signals mentioned above is determined in step S24, and if only the sync tag signal "SyncTagO" is true, step S25 is performed. If it is determined in step S24 that only the sync tag signal "SyncTag" is true, step S26 is performed. If the comparison result indicates that both SyncTag and SyncTagO signals are true, step S27 is performed. However, it will be apparent to one of the ordinary skill in the art that if both the sync tag signal "SyncTag" and the sync tag signal "SyncTagO" are true, besides performing step S27, either step S25 or step S26 is optionally performed, and the result of the implementation is within the scope of the present invention.

The data signal "DSEFM" is forwardly divided in accordance with the unit of the optical disc data length (e.g. 16 bits) by using the sync tag signal "SyncTagO" as a base in step S25. The data signal "DSEFM" is backwardly divided in accordance with the unit of the optical disc data length by using the sync tag signal "SyncTag" as a base in step S26. The implementation of this step can eliminate the disadvantage of the prior art. Finally, the data signal "DSEFM" is backwardly and forwardly divided in accordance with the unit of the optical disc data length simultaneously by using the sync tag signal "SyncTag" and the sync tag signal "SyncTagO" as its base respectively in step S27.

Figure 3:
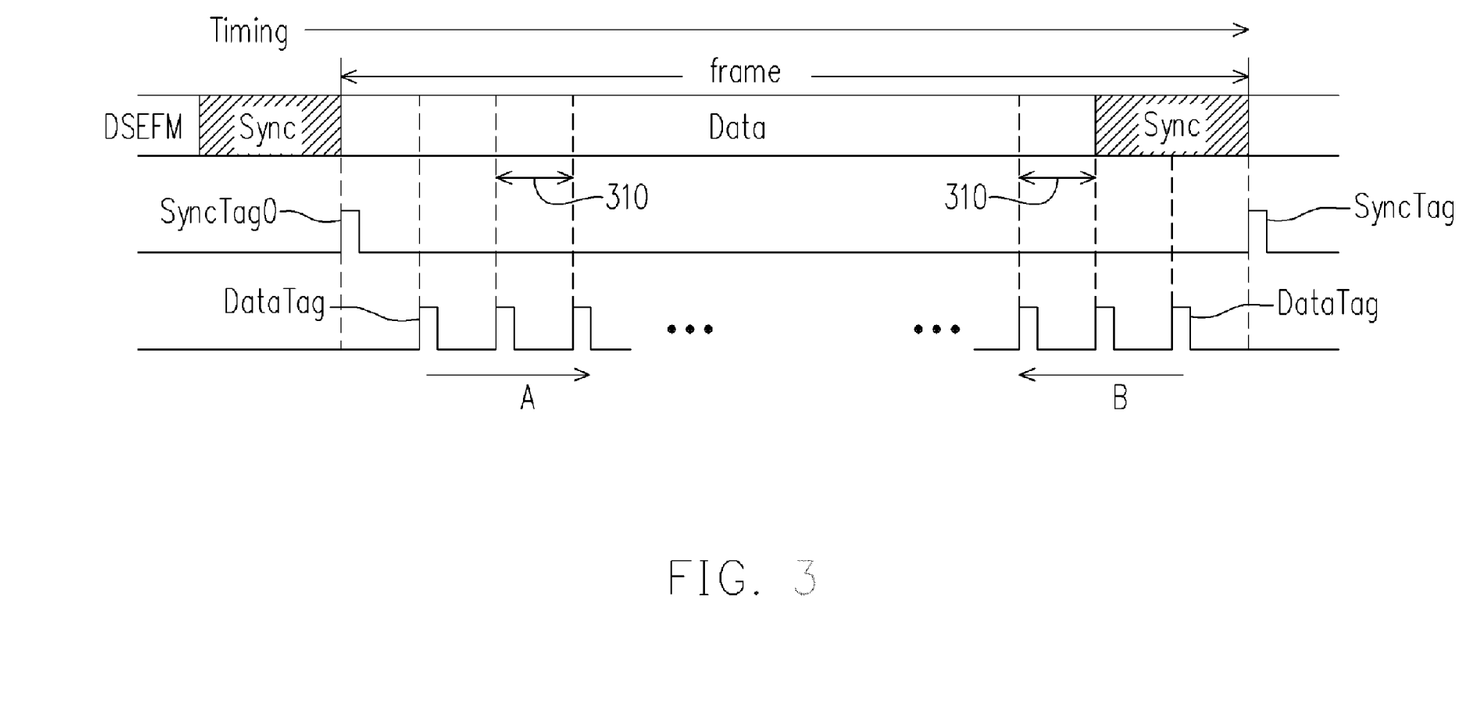
FIG. 3 is a timing diagram of the signals for sampling optical disc data according to an embodiment of the present invention.

In order to explain the method of dividing data as shown in steps S25~S27 of the present embodiment in greater details, a signal timing diagram is exemplified hereinafter for explanation. FIG. 3 is a timing diagram of the signals for sampling optical disc data according to a preferred embodiment of the present invention. Referring to FIG. 3, the timing direction is from left to right. The data signal "DSEFM" comprises data "DATA" and a sync pattern "sync", wherein both "DATA" and "sync" jointly constitute a frame "frame". The sync tag signals (e.g. SyncTagO and SyncTag as shown in the diagram) are obtained from detecting the sync pattern "sync". If the sync tag signal "SyncTagO" is true and the sync tag signal "SyncTag" is false, a data sampling tag signal "DataTag" is generated by using the sync tag signal "SyncTagO" as a base, along the forward direction A for a time distance in accordance with the time length of a data length unit 310 (e.g. 16 bits). Therefore, the data signal "DSEFM" can determine a data dividing point according to the data sampling tag signal "DataTag". If the sync tag signal "SyncTagO" is false and the sync tag signal "SyncTag" is true, a data sampling tag signal "DataTag" is generated by using the sync tag signal "SyncTag" as a base, along the backward direction B for a time distance in accordance with the time length of a data length unit 310. Therefore, the data signal "DSEFM" can determine a data dividing point according to the data sampling tag signal "DataTag".

If both the sync tag signal "SyncTagO" and the sync tag signal "SyncTag" are true, a data sampling tag signal "DataTag" is generated by using the sync tag signal "SyncTagO" as a base along the forward direction A for a time distance in accordance with the time length of a data length unit 310, and a data sampling tag signal "DataTag" is generated by using the sync tag signal "SyncTag" as a base along the backward direction B for a time distance in accordance with the time length of a data length unit 310. Therefore, the data signal "DSEFM" can determine a data dividing point according to the data sampling tag signal "DataTag". If both the sync tag signal "SyncTagO" and the sync tag signal "SyncTag" are false, in the present embodiment, a position from a base point, which is a base point in the case where both signals are not false mentioned above, backwardly moving a space of a frame is used as a base point for dividing data. Alternatively, a position where each frame should appear under the condition of not modifying with the sync tag signal can be used as the base point position.

The data sampling tag signal "DataTag" mentioned above is exemplified for explaining the auxiliary signal for dividing data and should not be not used to limit the application scope of the present invention.

Figure 4:
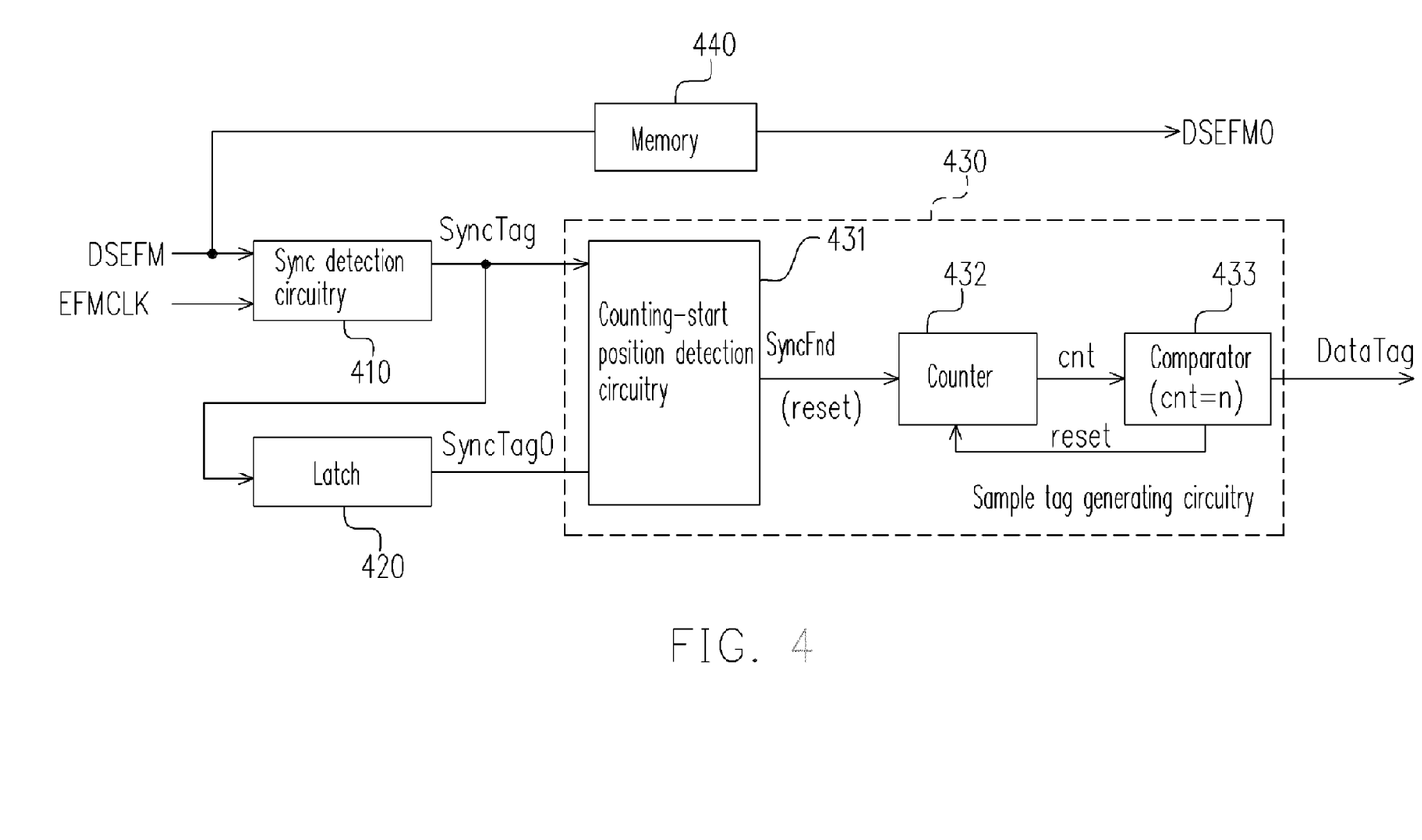
FIG. 4 is a schematic block diagram of an optical disc data sampling apparatus according to an embodiment of the present invention.

In summary of the method for sampling optical disc data mentioned above, the present invention further provides an optical disc data sampling apparatus. A preferred embodiment is exemplified for explaining the present invention hereinafter. FIG. 4 is a schematic block diagram of an optical disc data sampling apparatus according to a preferred embodiment of the present invention. Referring to FIG. 4, a sync detection circuitry 410 receives a data signal "DSEFM" and a clock signal "EFMCLK" from a previous stage circuitry, and generates a sync tag signal "SyncTag" according to a sync pattern in the timing detection data signal "DSEFM" of the clock signal "EFMCLK". A latch 420 maintains the sync tag signal "SyncTag" for a while and outputs it as a sync tag signal "SyncTagO" at the timing of next frame appears. The sync tag signal "SyncTagO" and the sync tag signal "SyncTag" are two sync tag signals appeared contiguously. A memory 440 stores the data signal "DSEFM" and generates a data signal "DSEFMO" under the control of the optical disc data sampling apparatus. The data signal "DSEFMO" and the data signal "DSEFM" are, for example, the data signals of two neighboring frames in the present embodiment. The capacity of the memory 440 in the present invention is, for example, the size of one frame's data signal "DSEFM". A sample tag generating circuitry 430 receives the sync tag signal "SyncTag" and the sync tag signal "SyncTagO", and generates a data sampling tag signal "DataTag" according to the result of whether these two signals are true of false.

The sample tag generating circuitry 430 mentioned above may be implemented by referring to the present embodiment and includes a counting-start position detection circuitry 431, a counter 432, and a comparator 433. The counting-start position detection circuitry 431 receives both the sync tag signal "SyncTagO" and the sync tag signal "SyncTag", determines a sampling-start timing by detecting and determining whether these two signals are true or false, and generates a sync tag signal "SyncFnd". The principle of determining the sampling-start timing mentioned above is as follows.

If the sync tag signal "SyncTagO" is true and the sync tag signal "SyncTag" is false, the sync tag signal "SyncTagO" is used as a base in the present embodiment to generate the sync tag signal "SyncFnd". If the sync tag signal "SyncTagO" is false and the sync tag signal "SyncTag" is true, the sync tag signal "SyncTag" is used as a base to backwardly count a length of one frame's time as its sampling-start timing, and generates the sync tag signal "SyncFnd", wherein in the present embodiment, for example, the sync tag signal "SyncTag" is used as a base to generate the sync tag signal "SyncFnd". If both the sync tag signal "SyncTagO" and the sync tag signal "SyncTag" are true, in the present embodiment, for example, the sync tag signal "SyncTagO" is used as a base to generate the sync tag signal "SyncFnd". However, it will be apparent to one of the ordinary skill in the art that in the case of both the sync tag signal "SyncTagO" and the sync tag signal "SyncTag" are true, the sync tag signal "SyncTag" also can be used as a base to generate the sync tag signal "SyncFnd", and the result is the same as the present embodiment.

The counter 432 counts the number from an initial value in accordance with a predetermined timing. In the present embodiment, the predetermined timing mentioned above is, for example, the clock signal "EFMCLK", and the initial value mentioned above is, for example, a value of 0. The counter 432 outputs a counting value "cnt", and the counting value "cnt" is reset to the initial value and the number is recounted again by the sync tag signal "SyncFnd" or a reset signal "reset". A comparator 433 receives the counting result "cnt" and compares it with a predetermined value "n". Once the counting result "cnt" is equal to the predetermined value "n", the comparator 433 issues the reset signal "reset" and the data sampling tag signal "DataTag". In the present embodiment, the reset signal "reset" and the data sampling tag signal "DataTag" are, for example, the same signal.

Figure 5:
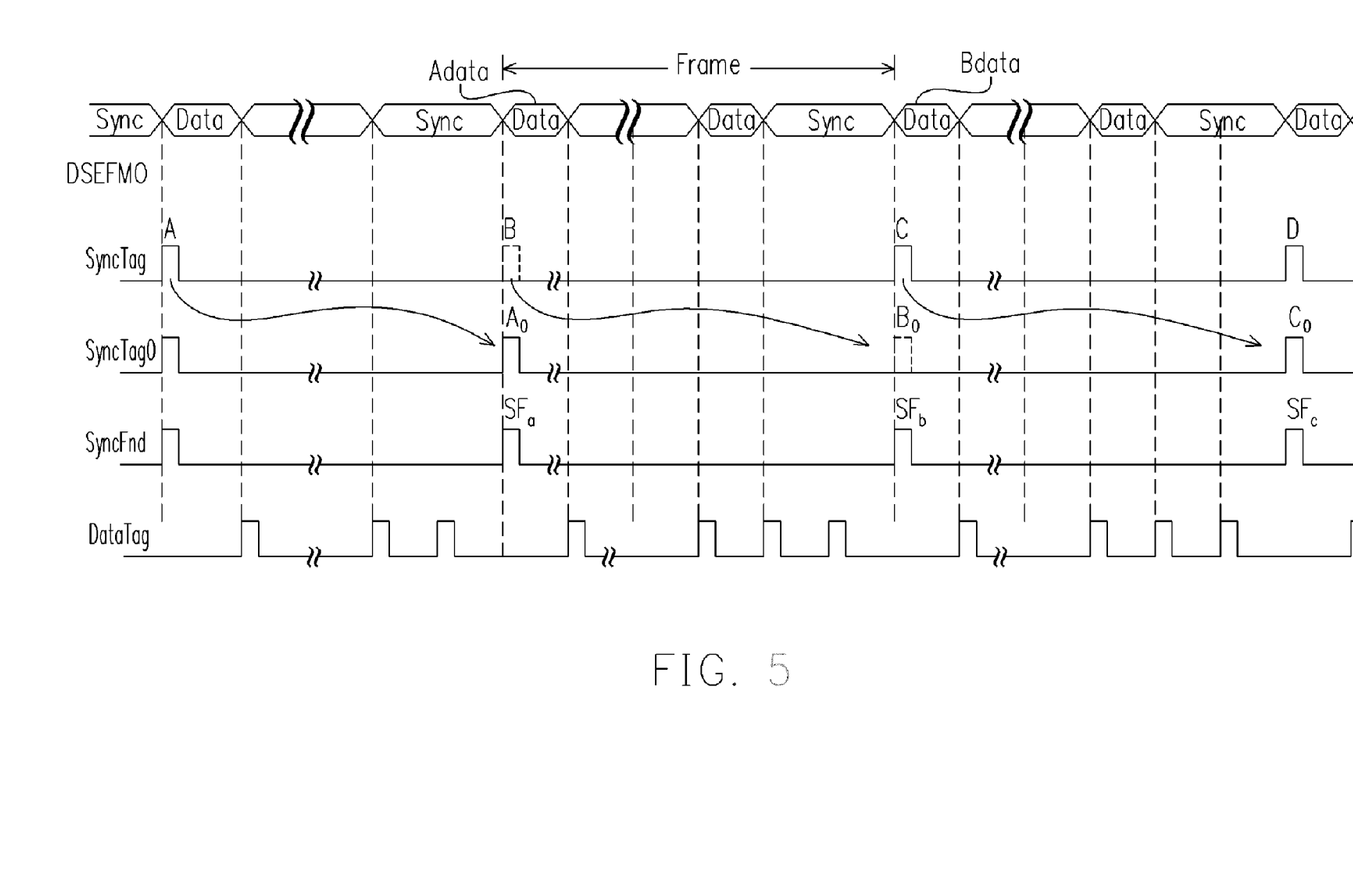
FIG. 5 is a signal timing diagram of the optical disc sampling apparatus shown in FIG. 4.

In order to explain the present embodiment in greater details, a signal timing diagram is exemplified hereinafter for explanation. FIG. 5 is a signal timing diagram of the optical disc sampling apparatus shown in FIG. 4. Referring to both FIG. 4 and 5, in the present embodiment, the memory 440 and the latch 420 maintain the data signal "DSEFM" and the sync tag signal "SyncTag" in the memory 440 and the latch 420 for a while, and output the signals as the data signal "DSEFMO" and the sync tag signal "SyncTagO", respectively after delaying it for a frame cycle. As shown in FIG. 5, the sync tag signal "Ao" and the data signal "Adata" are delayed for a frame cycle as mentioned above, thus the sync tag signals "A" (i.e. Ao in the diagram) and "B" on both sides of the frame can be detected simultaneously. The counting-start position circuitry 431 generates a sync tag signal "SFa" based on the sync tag signals "Ao" and "B". If the sync tag signal "B" cannot be generated by the accurate timing detection due to a scratch of the optical disc or other reason, the counting-start position circuitry 431 generates the sync tag signal "SFa" by using the timing of the sync tag signal "Ao" as its base. When the wrong sync tag signal "B" is maintained for a frame cycle and output as a sync tag signal "Bo", in the present embodiment, the counting-start position detection circuitry 431, for example, uses a sync tag signal "C" as a base to generate a sync tag signal "SFb", such that the disadvantages of the prior art is improved.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for sampling optical disc data, comprising:
   providing a first sync tag signal and a data signal;
   storing a previous first sync tag signal as a second sync tag signal;
   determining whether the first sync tag signal and the second sync tag signal are true or false; and
   dividing the data signal according to a result of whether the first sync tag signal and the second sync tag signal are true or false.

2. The method for sampling optical disc data of claim 1, wherein the step of dividing the data signal according to a result of whether the first sync tag signal and the second sync tag signal are true or false comprises:
   if only the first sync tag signal is true, backwardly dividing the data signal in accordance with a unit of a data length by using a timing of the first sync tag signal as a base; and
   if only the second sync tag signal is true, forwardly dividing the data signal in accordance with the unit of the data length by using a timing of the second sync tag signal as the base;
   wherein, the step of "backwardly" dividing the data signal counts the timing from the base to a past time, and the step of "forwardly" dividing the data signal counts the timing from the base to a future time.

3. The method for sampling optical disc data of claim 1, wherein the dividing the data signal according to a result of whether the first sync tag signal and the second sync tag signal are true or false further comprises:
   if both the first sync tag signal and the second sync tag signal are true, backwardly and forwardly dividing the data signal in accordance with a unit of a data length simultaneously by using a timing of the first sync tag signal and a timing of the second sync tag signal as a base, respectively.

4. The method for sampling optical disc data of claim 1, wherein the dividing the data signal according to a result of whether the first sync tag signal and the second sync tag signal are true or false further comprises:
   if both the first sync tag signal and the second sync tag signal are true, backwardly dividing the data signal in accordance with a unit of a data length by using a timing of the first sync tag signal as a base.

5. The method for sampling optical disc data of claim 1, wherein the dividing the data signal according to a result of whether the first sync tag signal and the second sync tag signal are true or false further comprises:
if both the first sync tag signal and the second sync tag signal are true, forwardly dividing the data signal in accordance with a unit of a data length by using a timing of the second sync tag signal as a base.

6. The method for sampling optical disc data of claim 1, wherein the dividing the data signal according to a result of whether the first sync tag signal and the second sync tag signal are true or false further comprises:
if both the first sync tag signal and the second sync tag signal are false, a position backwardly moved from a base point position of a case when both signals are not false a distance of a frame length is used as a base point for dividing data.

7. The method for sampling optical disc data of claim 1, wherein the dividing the data signal according to a result of whether the first sync tag signal and the second sync tag signal are true or false further comprises:
if both the first sync tag signal and the second sync tag signal are false, a position on which each frame should appear under the condition of not using the sync tag signal correction is used as the base point position.

8. The optical disc data sampling apparatus of claim 1, wherein the step of dividing the data signal according to a result of whether the first sync tag signal and the second sync tag signal are true or false further comprises:
if both the first sync tag signal and the second sync tag signal are false, moving backward a distance of a frame length from a base point position of a case when both signals are not false as a base point for dividing data.

9. The optical disc data sampling apparatus of claim 1, wherein the step of dividing the data signal according to a result of whether the first sync tag signal and the second sync tag signal are true or false further comprises:
if both the first sync tag signal and the second sync tag signal are false, a position on which each frame appears under the condition of not using the sync tag signal correction is used as the base point position.

10. An optical disc data sampling apparatus, comprising:
a sync detection circuitry means for receiving a clock signal and a data signal and generating a first sync tag signal by using the clock signal to detect the data signal;
a latch means having an input terminal for receiving the first sync tag signal, and an output terminal for propagating a second sync tag signal;
a sample tag generating circuitry means for receiving the first sync tag signal and the second sync tag signal and generating a data sampling tag signal according to a result of whether these two signals are true or false; and
a memory means for storing the data signal, wherein the sampling apparatus is configured to propagate the data signal from the memory in accordance with a timing of the data sampling tag signal.

11. The optical disc data sampling apparatus of claim 10, wherein a capacity of the memory is at least big enough to store a whole frame of data.

12. The optical disc data sampling apparatus of claim 10, wherein the sample tag generating circuitry comprises:
a counting-start position detection circuitry means for determining a sampling-start timing according to a result of whether the first sync tag signal and the second sync tag signal are true or false and propagating a third sync tag signal in accordance with the sampling-start timing;
a counter means for obtaining and propagating a counting value by counting the value from an initial value in accordance with a predetermined timing, wherein the counter is reset to the initial value and the value is recounted again by a reset signal or the third sync tag signal; and
a comparator means for receiving the counting value and comparing the counting value with a predetermined value and propagating the reset signal and the data sampling tag signal when the counting value reaching the predetermined value.

13. The optical disc data sampling apparatus of claim 12, wherein the reset signal and the data sampling tag signal are the same signal.

14. The optical disc data sampling apparatus of claim 12, wherein the predetermined timing is a timing of the clock signal.

15. The optical disc data sampling apparatus of claim 12, wherein the initial value is a value of 0.

16. The optical disc data sampling apparatus of claim 12, wherein the counting-start position detection circuitry means includes means for:
backwardly counting the sampling-start timing in accordance with a frame cycle by using a timing of the first sync tag signal as a base if only the first sync tag signal is true; and
using a timing of the second sync tag signal as the sampling-start timing if only the second sync tag signal is true;
wherein backwardly counting the sampling-start timing includes counting the timing from the base to a pass time.

17. The optical disc data sampling apparatus of claim 16, wherein the counting-start position detection circuitry means includes means for:
using the timing of the second sync tag signal as the sampling-start timing if both the first sync tag signal and the second sync tag signal are true.

18. The optical disc data sampling apparatus of claim 16, wherein the counting-start position detection circuitry means includes for:
backwardly counting the sampling-start timing in accordance with the frame cycle by using a timing of the first sync tag signal as a base if both the first sync tag signal and the second sync tag signal are true.

19. A method, comprising:
receiving a data signal and a current sync tag signal;
delaying the data signal and the current sync tag signal for a frame length;
detecting the current sync tag signal and a previously received sync tag signal; and
generating a new sync tag signal based on the current sync tag signal and the previously received sync tag signal.

20. A system, comprising:
means for receiving a data signal and a current sync tag signal; means for delaying the data signal and the current sync tag signal for a frame length;
means for detecting the current sync tag signal and a previously received sync tag signal; and
means for generating a new sync tag signal based on the current sync tag signal and the previously received sync tag signal.

21. An apparatus, comprising:
a sync tag signal component configured to detect a data signal and a clock signal and to generate a sync tag signal;

a signal delay component configured to receive sync tag signals from the sync tag signal component and delay output of one or more of the received sync tag signals; and a data tag signal component configured to generate a data tag signal based on signals output from the sync tag signal component and the signal delay component.

22. The apparatus of claim 21, wherein the sync tag signal component is configured to generate the sync tag signal based on a timing detection data signal of the clock signal.

23. The apparatus of claim 21, wherein signal delay component is configured to output a sync tag signal after duration of a frame.

24. The apparatus of claim 21 wherein the data tag signal component is configured to generate the data tag signal based on a comparison of received signals.

25. The apparatus of claim 21, wherein the data tag signal component includes:

a position detection component configured to generate a subsequent sync tag signal based on a signal received from the sync tag signal component or the signal delay component.

* * * * *